3,424,713
RUBBER STABILIZED WITH A MIXTURE
OF p-PHENYLENEDIAMINES
Arthur E. Oberster, North Canton, and George E. P. Smith, Jr., Akron, Ohio, assignors to The Firestone Tire & Rubber Company, Akron, Ohio, a corporation of Ohio
No Drawing. Filed Feb. 21, 1966, Ser. No. 528,803
U.S. Cl. 260—45.9   8 Claims
Int. Cl. C08d 9/00; C08f 45/60

ABSTRACT OF THE DISCLOSURE

An olefin rubber is vulcanized with sulfur and (a) N-2(4-methyl - 4-hydroxypentyl)-N'-phenyl-para-phenylene-diamine and (b) N,N-dialkyl-para-phenylenediamine.

---

This invention relates to a new antizonant synergistic mixture for use in synthetic and natural rubber vulcanizates, and vulcanizate obtained by curing compositions of such rubbers which contain the antizonant mixture.

The mixture is a synergistic mixture of two derivatives of para-phenylenediamine (herein designated as PPD). It is constituted of 1 to 5 parts per hundred parts of the rubber of (a) 0.5 to 2.5 parts of N-2(4-methyl-4-hydroxypentyl)-N'-phenyl-PPD and (b) a total of 0.5 to 2.5 parts of one or more N,N'-dialkyl-PPDs in which the alkyl groups are the same or different and are branched-chain or straight-chain alkyl groups which contain 6 to 8 carbon atoms, and more particularly secondary alkyl groups, such as N,N'-di-2(5-methylhexyl)-PPD
N,N'-di-2(4-methylpentyl)-PPD
N,N'-di-2-octyl-PPD
N,N'-di-3(5-methylheptyl)-PPD The same or different amounts of the two components may be used.

Many derivatives of p-phenylenediamine are too toxic for plant use. The mixture of this invention has been shown to be safe for such use. The rubbers obtained have good physical properties and are quite resistant to the deteriorating action of oxygen as well as ozone.

The rubbers which may be used include natural rubber and diolefin synthetic rubbers vulcanizable by heating with sulfur including polybutadiene, polyisoprene, various copolymers of conjugated diolefins and vinyl compounds, such as SBR (copolymer of butadiene and styrene) and NBR (copolymer of butadiene and acrylonitrile), copolymers of butadiene or isoprene with alphamethylstyrene, ring-substituted styrenes, chloromethyl styrene, etc., butadiene-isoprene copolymer, isobutylene-isoprene, butadiene-vinylpyridine copolymers and terpolymers, EPDM rubbers (terpolymers of ethylene, propylene and a nonconjugated diolefin, e.g. dicyclopentadiene), such rubbers also being known as "EPT" or ethylene-propylene terpolymers. The antiozonants are effective in stocks containing a high percentage of carbon black and in oil-extended rubbers.

The components of the synergistic mixture may be mixed before being added to the rubber, or they may be added separately to the rubber. The rubber is otherwise compounded and cured in any usual way.

The following examples are illustrative. In the tables, Component A is N - 2(4 - methyl - 4-hydroxypentyl)-N'-phenyl-PPD and Component B is N,N'-di-2(5-methylhexyl)-PPD, the formulae for which are:

COMPONENT A

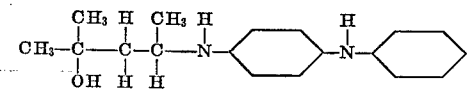

COMPONENT B

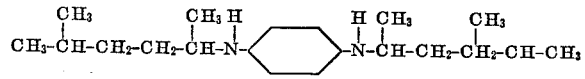

Component A may be prepared as follows:
The following reactants were placed in a 250 ml. hydrogenation bottle and placed on a shaker:

N-phenyl-p-phenylenediamine (0.2 mole) ____gr__ 37.8
Diacetone alcohol—acetone free (0.25 mole) __gr__ 26.1
Absolute ethanol _____ml__ 200
Glacial acetic acid_____ml__ 2.0
$PtO_2$ (Adam's catalyst) _____mg__ 200

The hydrogenator bottle containing the foregoing, was flushed several times with hydrogen and then subjected to 50 p.s.i.g. hydrogen. The shaker was started and in about 80 minutes the uptake of hydrogen had ceased. The uptake was 15.5 p.s.i.g., which corresponds to 95 percent of theoretical. The reaction flask was then removed and the catalyst was separated by filtration. The solvent was then removed by distillation in vacuum and the thick oily residue was chromatographed on alkaline alumina. The material eluted with petroleum ether (B.P. 30–60° C.)/ether mixtures was a red colored oil. This material weighed 38.7 gr. corresponding to a yield of 68 percent theoretical. Infrared analysis shows the presence of —OH and —NH, mono- and p-disubstituted phenyl groups. Analysis calculated for $C_{18}H_{24}N_2O$: C–76.02, H–8.51, N–9.85; Found: C–76.25, H–8.48, N–9.98.

The following tables refer to comparative tests on a pneumatic tire black sidewall stock, based essentially on an oil-extended rubber containing 37.5 parts of oil per 100 parts of emulsion-polymerized SBR.

In the ozone tests to which the following tables refer, the rubber strips were kept at 12½ percent elongation for 50 minutes of each hour and dynamically flexed from 0 to 20 percent elongation for 10 minutes of each hour. The strips were then examined under 5-power magnification and the degree of cracking evaluated visually and rated on the following scale: severe, moderate and slight.

The amounts of the different ingredients in the mix are given in Table I. The ozone tests reported in the table were run in an atmosphere of 60 parts of ozone per hundred million parts of air, for 14 hours at 40° F. The results not only show the good physical properties of the vulcanizate but also show the synergistic antiozonant effect of the mixture, by comparison with the results obtained with each individual component.

TABLE I

| Ingredient | Example 1 | Example 2 | Example 3 |
|---|---|---|---|
| Masterbatch | 235.5 | 235.5 | 235.5 |
| Sulfur | 2.0 | 2.0 | 2.0 |
| Accelerator | 1.2 | 1.2 | 1.2 |
| Component A | 2.8 |  | 1.4 |
| Component B |  | 2.8 | 1.4 |
| Total | 241.5 | 241.5 | 241.5 |

Cure 23 minutes at 300° F.

Physical properties

| | | | |
|---|---|---|---|
| Normal: | | | |
| 300% Modulus, p.s.i. | 725 | 700 | 725 |
| Tensile Strength, p.s.i. | 1,550 | 1,575 | 1,575 |
| Elongation, percent | 610 | 620 | 610 |
| After Oven Aging 4 days at 212° F.: | | | |
| 300% Modulus, p.s.i. | 1,400 | 1,350 | 1,375 |
| Tensile Strength, p.s.i. | 1,525 | 1,550 | 1,550 |
| Elongation, percent | 330 | 350 | 340 |
| Ozone Ratings | Moderate | Severe | Slight |

In Table II, the ozone tests were carried out in an atmosphere containing 60 parts ozone per hundred million parts of air, for 14 hours at 95° F. The results again show the good antiozonant effectiveness of various mixtures of components A and B.

The same masterbatch was used as in the previous table.

TABLE II

| Ingredient | Example 4 | Example 5 | Example 6 | Blank |
|---|---|---|---|---|
| Masterbatch | 235.5 | 235.5 | 235.5 | 235.5 |
| Sulfur | 2.0 | 2.0 | 2.0 | 2.0 |
| Accelerator | 1.2 | 1.2 | 1.2 | 1.2 |
| Component A | 1.3 | 1.4 | 1.3 | |
| Component B | 1.5 | 1.4 | 1.2 | |
| Total | 241.5 | 241.5 | 241.2 | 238.7 |

Cure: 23 minutes at 300° F.

| Physical Properties | | | | |
|---|---|---|---|---|
| Normal: | | | | |
| 300% Modulus, p.s.i. | 675 | 650 | 675 | 700 |
| Tensile Strength, p.s.i. | 1,500 | 1,575 | 1,575 | 1,550 |
| Elongation, percent | 630 | 640 | 630 | 600 |
| After oven aging 4 days at 212° F.: | | | | |
| 300% Modulus, p.s.i. | 1,300 | 1,325 | 1,300 | 1,500 |
| Tensile Strength, p.s.i. | 1,500 | 1,575 | 1,525 | 1,500 |
| Elongation, percent | 360 | 380 | 360 | 300 |
| After Exposure to Ozone | Slight | Slight | Slight | Moderate |

By sulfur-vulcanization is meant the curing of rubber by reaction with either free sulfur or a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including the dialkylamine polysulfides and reaction products of primary amines with excess sulfur. Known vulcanization accelerators are useful in speeding up the vulcanization process and operative herein, especially the relatively active accelerators including the thiazole sulfenamides, e.g. N-cyclohexyl-2-benzothiazolesulfenamide, thiazoline sulfenamides, thiocarbamyl sulfenamides, mercaptothiazoles, mercaptothiazolines, thiazolyl mono- and di-sulfides, the N,N'-disubstituted dithiocarbamates, the thiuram sulfides, the xanthogen sulfides, and metallic salts of mercaptothiazoles or mercaptothiazolines or dithiocarbamic acids.

Any usual vulcanizing times and temperatures can be used in producing the vulcanizates of the invention.

The invention relates to soft rubber vulcanizates from natural and/or synthetic rubbers, and the usual amount of available sulfur can be employed. For example, vulcanizates can be produced from rubber compositions containing from about 0.2 to about 12 parts by weight of available sulfur per 100 parts of the rubber, it being understood that the sulfur can be employed as elemental sulfur or as available sulfur present in a sulfur-bearing curing agent of the sulfur-donor type.

We claim:
1. A vulcanizable composition comprising a sulfur-vulcanizable olefin rubber, sulfur and between 0.5 and 2.5 parts of each of the following per 100 parts of the rubber:

(a) N - 2(4-methyl-4-hydroxypentyl)-N'-phenyl-para-phenylenediamine, and
(b) N,N'-dialkyl-para-phenylenediamine, in which each alkyl group is a secondary alkyl group which contains 6 to 8 carbon atoms.

2. The composition of claim 1 in which the (b) component is N,N' - di - 2(5-methylhexyl)-para-phenylenediamine.

3. The composition of claim 1 in which the rubber is butadiene-styrene copolymer.

4. The composition of claim 3 in which the (b) component is N,N'-di-2(5-methylhexyl)-para-phenylenediamine.

5. The vulcanizate produced by heating the composition of claim 1.

6. The vulcanizate produced by heating the composition of claim 2.

7. The vulcanizate produced by heating the composition of claim 3.

8. The vulcanizate produced by heating the composition of claim 4.

References Cited

UNITED STATES PATENTS 2,867,604  1/1959  Rosenwald et al. ____ 260—45.9
3,032,520  5/1962  Shaw _____ 260—45.9
3,337,494  8/1967  Reid et al. _____ 260—45.9

DONALD E. CZAJA, Primary Examiner.

H. E. TAYLOR, JR., Assistant Examiner.

U.S. Cl. X.R.

252—403, 401; 260—23.7, 94.3, 809, 810, 41.5, 785, 786, 793, 33.6